United States Patent [19]

Diehl et al.

[11] Patent Number: 4,803,506
[45] Date of Patent: Feb. 7, 1989

[54] ELECTROMAGNETIC CONTROL DEVICE FOR CAMERAS

[75] Inventors: Conrad Diehl; Anthony DiRisio, both of Rochester, N.Y.

[73] Assignee: Eastman Kodak Company, Rochester, N.Y.

[21] Appl. No.: 143,789

[22] Filed: Jan. 14, 1988

[51] Int. Cl.$^4$ .............................................. G03B 3/00
[52] U.S. Cl. ................................ 354/400; 354/271.1; 354/448; 335/276
[58] Field of Search ............... 354/234.1, 235.1, 195.1, 354/448, 271.1, 258.1, 400, 259; 335/220, 222, 223, 238, 270, 276

[56] References Cited

U.S. PATENT DOCUMENTS

| | | | |
|---|---|---|---|
| 3,435,745 | 4/1969 | Fukushima | 354/258.1 |
| 3,724,351 | 4/1973 | Matsumoto | 354/234.1 |
| 3,762,297 | 10/1973 | Kitai | 354/234.1 |
| 4,137,514 | 1/1979 | Wright et al. | 335/220 |
| 4,342,018 | 7/1982 | Numata et al. | 335/270 |
| 4,360,258 | 11/1982 | Hashimoto | 354/195.1 |
| 4,378,150 | 3/1983 | Hasmimoto et al. | 354/234.1 |
| 4,728,979 | 3/1988 | Akitake et al. | 354/400 |

Primary Examiner—L. T. Hix
Assistant Examiner—David M. Gray
Attorney, Agent, or Firm—Roger A. Fields

[57] ABSTRACT

An electromagnetic control device for a camera or the like is provided with a magnet core having an attracting face and with an armature pivotally connected to a control member for movement about a pivot axis to allow tilting of an attracted face of the armature into intimate face contact with the attracting face of the magnet core. The control member is pivotally mounted for movement about a pivot axis, to swing the armature to urge its attracted face against the attracting face of the magnet core, until the attracted face is tilted into intimate face contact with the attracting face. A degree of free play exists at the pivotal mounting of the control member to allow the control member to move about the pivot axis of the armature after the attracted face of the armature is tilted into face contact with the attracting face of the magnet core. Thus, the control member will be moved first about its pivot axis to effect face contact of the two faces and then about the pivot axis of the armature to permit overtravel of the control member to a particular position.

6 Claims, 2 Drawing Sheets

ELECTROMAGNETIC CONTROL DEVICE FOR CAMERAS

BACKGROUND OF THE INVENTION

1. Field of the Invention

The invention relates generally to the field of photography and more particularly to an electromagnetic control device for use in a camera or the like to control a function of the camera.

2. Description of the Prior Art

Typically in cameras, it is known to include an electromagnetic control device for controlling one or several functions of the camera, such as shutter timing or lens focusing. The accuracy of each function greatly depends upon an intimate face-to-face contact of the attracting face of a magnet core and the attracted face of an armature which is usually pivotally connected to a control lever, as in U.S. Pat. No. 4,342,018, granted July 27, 1982, U.S. Pat. No. 4,360,258, granted Nov. 23, 1982, and U.S. Pat. No. 3,762,297, granted Oct. 2, 1973.

When the attracting face of the magnet core and the attracted face of the armature are not in perfect face contact, the attracting force acting between the two faces is markedly lowered and there is a possibility of a malfunction of the control lever. At worst, there is the possibility that the armature will move apart from the magnet core before the magnet core is demagnetized. Furthermore, there is the possibility that the timing of separation of the armature from the magnet core will not be accurately controlled.

The imperfect face-to-face contact between the attracting face of the magnet core and the attracted face of the armature is caused generally by errors in mounting the various elements of the control device, and it often occurs when there is a need for the control lever to overtravel to a particular position after the two faces are brought into face contact.

SUMMARY OF THE INVENTION

The above-described problems associated with known electromagnetic control devices for cameras are believed to be solved by an improved electromagnetic control device, wherein said control device is generally of the type provided with (a) a control member, (b) magnet means having an attracting face, (c) an armature pivotally connected to said control member for movement about a pivot axis to allow tilting of an attracted face of said armature into face contact with said attracting face of the magnet means, and (d) means pivotally mounting said control member for movement about a pivot axis to swing said armature to urge its attracted face against said attracting face of the magnet means until said attracted face is tilted into face contact with said attracting face, and wherein the improvement comprises:

said mounting means including free play means for allowing some degree of free play of said control member at its pivot axis to, in turn, allow the control member to move about the pivot axis of said armature after said attracted face of the armature is tilted into face contact with said attracting face of the magnet means, whereby said control member can be moved first about its pivot axis to obtain perfect face-to-face contact of the two faces and then about the pivot axis of said armature to permit overtravel of the control member.

DESCRIPTION OF THE PREFERRED EMBODIMENT

Figure 1:
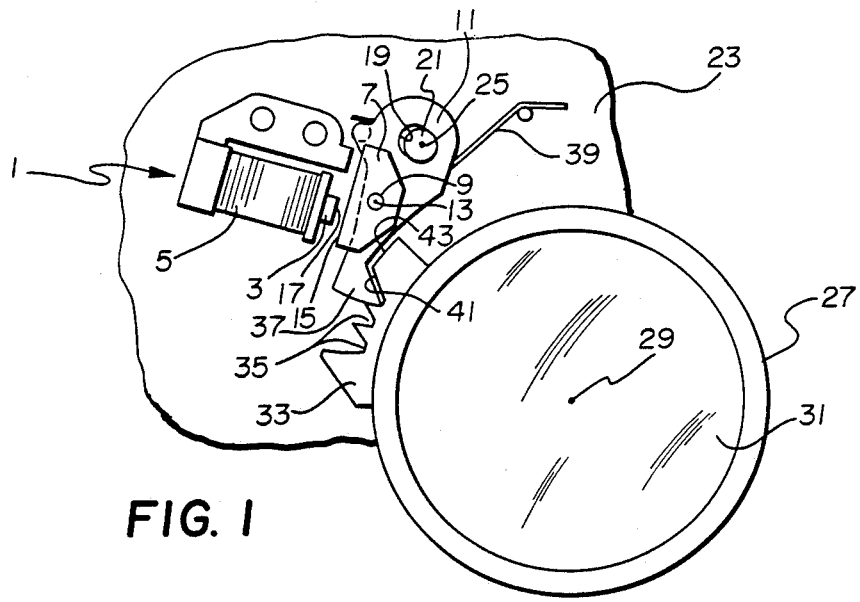
FIG. 1 is a plan view of an improved electromagnetic control device according to a preferred embodiment of the invention, showing a control member of the device securing a focusing ring of a camera in a focus position.

Referring now to the drawings and in particular to FIG. 1, an electromagnetic control device 1 is shown having a core 3 of magnetic material surrounded by a coil 5 of wire through which an electric current is passed to energize the control device by magnetizing the core. An armature 7, formed from magnetic material, is pivotally connected at a pin 9 to a control lever 11 for movement about a pivot axis 13 to allow tilting of an attracted flat face 15 of the armature in a counterclockwise direction in FIG. 1 about the pivot axis into intimate face-to-face contact with an attracting flat face 17 of the magnet core 3. The control lever 11 has an opening or slot 19 through which a pivot pin 21, fixed to a support plate 23, extends to mount the control lever for movement about a pivot axis 25, particularly to swing the armature 7 to urge its attracted face 15 against the attracting face 17 of the magnet core 3 until the attracted face is tilted into perfect face contact with the attracting face. See FIG. 3. A clearance C exists between the opening 19 in the control lever 11 and the pivot pin 21 to allow some degree of free play of the control lever at its pivot axis 25 to, in turn, allow the control lever to move about the pivot axis 13 of the armature 7 after the attracted face 15 of the armature is tilted into face contact with the attracting face 17 of the magnet core 3. See FIG. 4.

A focusing ring 27, preferably the type used in a camera or the like, is supported by suitable means, not shown, for rotation about an optical axis 29 of an objective lens 31 to locate the focusing ring in anyone of several available focus positions corresponding to a like number of focus settings of the objective lens. A stop member 33, fixed to the periphery of the focusing ring 27, has a plurality of similar shaped notches 35 respectively engageable by an arresting pawl 37 of the control lever 11 to secure the focusing ring in each of its focus positions. The control lever 11 is biased by a spring 39 to rotate in a counterclockwise direction in FIG. 1 about its pivot axis 25 to locate the pawl 37 in anyone of the notches 35. The spring 39 further serves to lightly resist the free play of the control lever 11 at the pivot axis 25 of the control lever, and it is not strong enough to overcome the attractive force of the magnet core 3 when the control device 1 is energized.

Operation

Figure 4:
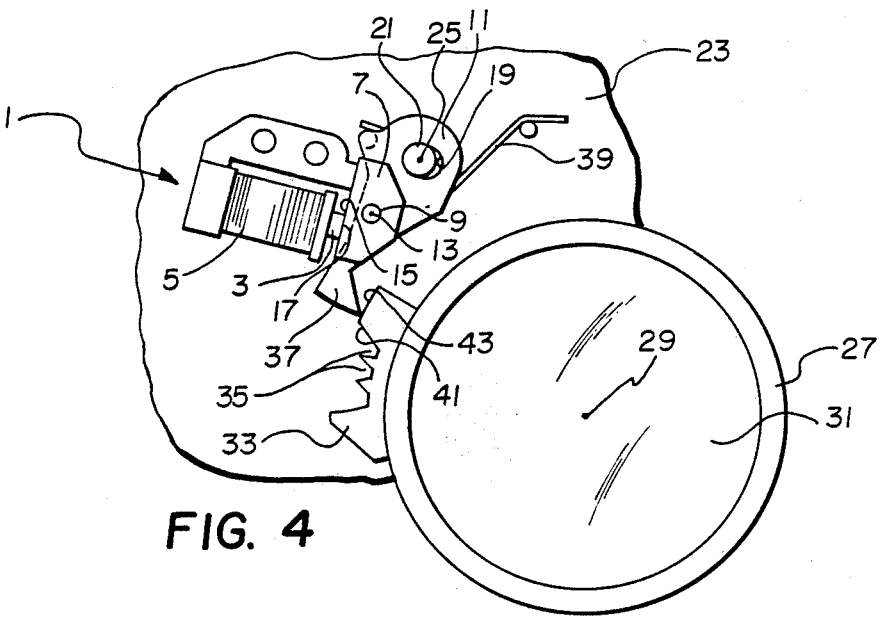

FIG. 4 depicts the focusing ring 27 in a home or start position and the control lever 11 in an idle position. Immediately before the focusing ring 27 is rotated out of its home position to a selected one of its focus positions, the control device 1 is energized to magnetize the magnet core 3 to hold the control lever 11 in its idle position (against the contrary urging of the spring 39). Rotation of the focusing ring 27 from its home position to anyone of its focus positions is in a clockwise direction in FIG. 4 about the optical axis 29, and it is effected by known drive means, such as a motor, not shown. When the focusing ring 27 is rotated to a selected one of its focus positions, the control device 1 is de-energized to discontinue the attracting force of the magnet core 3. This allows the spring 39 to pivot the control lever 11 in a counterclockwise direction in FIG. 1 about its pivot axis 25 to an operative position. This is the position in which the arresting pawl 37 of the control lever 11 is located in one of the notches 35 to secure the focusing ring 27 in the selected focus position.

Figure 2:
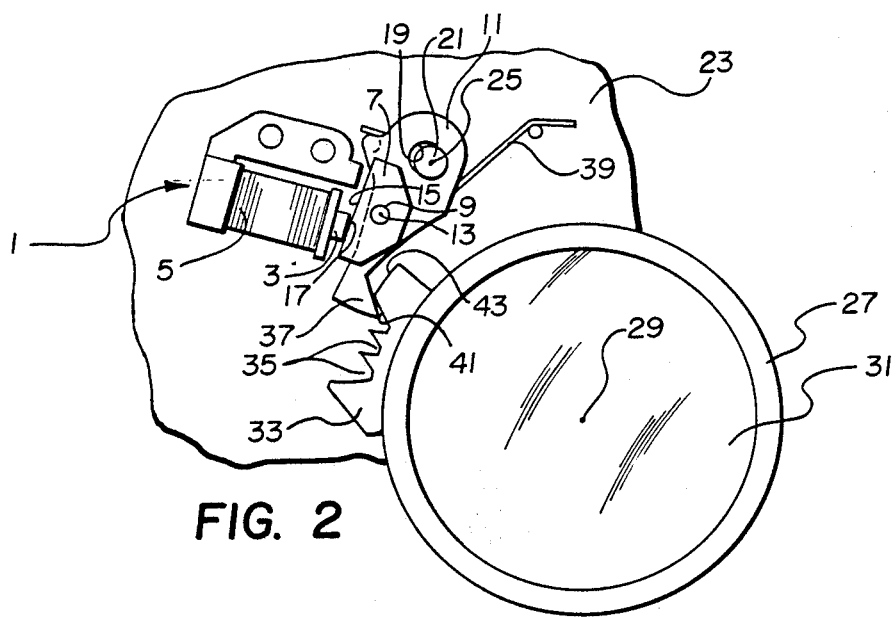
FIGS. 2-4 are plan views similar to FIG. 1, showing operation of the control device in successive stages as the focusing ring is rotated in a counterclockwise direction from its focus position to a home or start position.

In FIG. 2, operation has begun some time later to return the focusing ring 27 to its home position, such as after a picture has been taken. Specifically, the focusing ring 27 is rotated in a counterclockwise direction in FIG. 2 about the optical axis 29, causing an inclined cam surface 41 of the stop member 33 to bear against the arresting pawl 37 of the control lever 11 to pivot the control lever in a clockwise direction in FIG. 2 about its pivot axis 25 from its operative position in FIG. 1 (securing the focusing ring in the selected focus position). As can be seen in FIG. 2, the attracted face 15 of the armature 7, although touching the attracting face 17 of the magnet core 3, is not yet flush with the attracting face but rather is slightly tilted from the attracting face.

Figure 3:
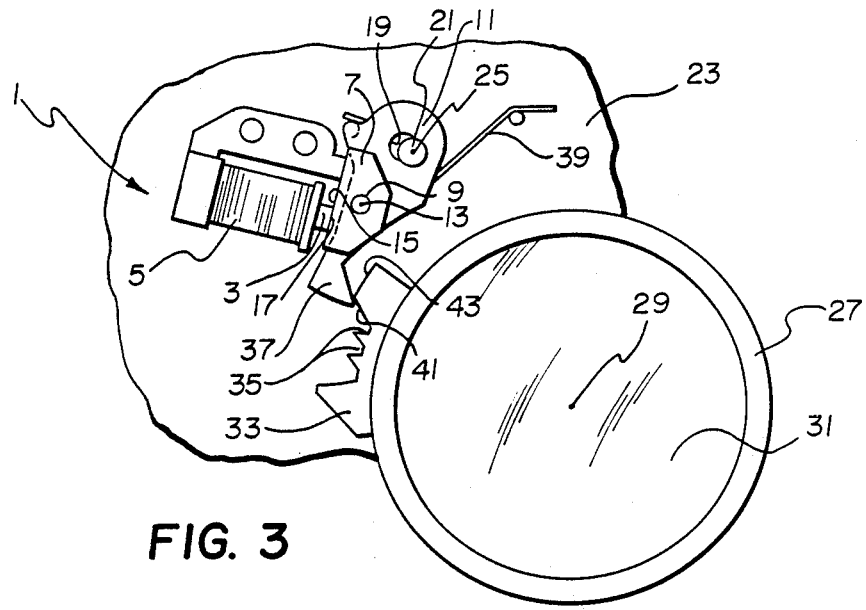

In FIG. 3, continued counterclockwise rotation of the focusing ring 27 continues to pivot the control lever 11 clockwise about its pivot axis 25, urging the armature 7 to be tilted in a counterclockwise direction in FIG. 3 about its pivot axis 13 until the attracted face 15 of the armature is tilted into perfect face-to-face contact with the attracting face 17 of the magnet core 3.

When the attracted face 15 of the armature 7 is tilted into perfect face contact with the attracting face 17 of the magnet core 3, the control lever 11 can no longer pivot in a clockwise direction in FIG. 3 about its pivot axis 25. However, the focusing ring 27 is not yet in its home position and the control lever 11 is not yet in its idle position. A solution is provided by the clearance C which exists between the opening 19 in the control lever 11 and the pivot pin 21 to allow some degree of free play of the control lever at its pivot axis 25. The result of this is shown in FIG. 4, where continued counterclockwise rotation of the focusing ring 27 until the arresting pawl 37 of the control lever 11 is cammed atop a plateau 43 of the stop member 33 causes the control lever to be pivoted in a counterclockwise direction about the pivot axis 13 of the armature 7, leaving the armature in place with its attracted face 15 remaining in face contact with the attracting face 17 of the magnet core.

Thus, in operation, the control lever 11 is first moved about its pivot axis 25 to obtain face-to-face contact of the attracted face 15 of the armature 7 with the attracting face 17 of the magnet core 3 and then is moved about the pivot axis 13 of the armature to permit overtravel of the control member to its idle position.

The invention has been described with reference to a preferred embodiment. However, it will be appreciated that variations and modifications can be effected within the ordinary skill in the art without departing from the scope of the invention.

We claim:

1. An improved electromagnetic control device for a camera or other photographic apparatus, wherein said control device is of the type provided with (a) a control member, (b) magnet means having an attracting face, (c) an armature pivotally connected to said control member for movement about a pivot axis to allow tilting of an attracted face of said armature into face contact with said attracting face of the magnet means, and (d) means pivotally mounting said control member for movement about a pivot axis to swing said armature to urge its attracted face against said attracting face of the magnet means until said attracted face is tilted into face contact with said attracting face, and wherein the improvement comprises:

some mounting means including free play means for allowing some degree of free play of said control member at its pivot axis to, in turn, allow the control member to move about the pivot axis of said armature after said attracted face of the armature is tilted into face contact with said attracting face of the magnet means, whereby said control member will be moved first about its pivot axis and then about the pivot axis of said armature.

2. The improvement as recited in claim 1, wherein said control member is movable in a predetermined direction about its pivot axis initially to separate said armature from said magnet means and then to an operative position for performing a function relating to operation of the camera and is movable in a reverse direction first about its pivot axis to put said attracted face of the armature into face contact with said attracting face of the magnet means and then about the pivot axis of said armature to an idle position.

3. The improvement as recited in claim 2 wherein said mounting means includes a pin extending through an opening to pivotally mount said control member, and said free play means includes a clearance between said pin and said opening sufficient to allow the free play of said control member at its pivot axis and spring means for lightly resisting the free play and for biasing the control member from its idle position to its operative position.

4. The improvement as recited in claim 3, wherein said magnet means is energizable to hold said attracted face of the armature against said attracting face of the magnet means to prevent movement of said control member to its operative position.

5. The improvement as recited in claim 4, wherein said control member includes arresting means for engaging a focusing element of the camera in a focus position upon movement of the control member to its operative position and for disengaging from said focusing element upon movement of said control member to its idle position.

6. The improvement as recited in claim 5, wherein said focusing element includes cam means for moving said control member from its operative position to its idle position to put said attracted face of the armature into face contact with said attracting face of the magnet means.

* * * * *